United States Patent
Jiao et al.

(10) Patent No.: US 8,908,471 B2
(45) Date of Patent: Dec. 9, 2014

(54) METHOD FOR BUILDING VELOCITY MODELS FOR IMAGING IN MULTI-AZIMUTH MARINE SEISMIC SURVEYS

(75) Inventors: Junru Jiao, Katy, TX (US); Chaoguang Zhou, Spring, TX (US); Yeashung Sonny Lin, Sugar Land, TX (US); Sverre Brandsberg-Dahl, Houston, TX (US)

(73) Assignee: PGS Geophysical AS, Oslo (NO)

( * ) Notice: Subject to any disclaimer, the term of this patent is extended or adjusted under 35 U.S.C. 154(b) by 801 days.

(21) Appl. No.: 12/800,978

(22) Filed: May 27, 2010

(65) Prior Publication Data

US 2011/0292761 A1    Dec. 1, 2011

(51) Int. Cl.
  *G01V 1/38*    (2006.01)
  *G01V 1/30*    (2006.01)

(52) U.S. Cl.
  CPC ...................... *G01V 1/303* (2013.01)
  USPC ................................. 367/21; 367/73

(58) Field of Classification Search
  CPC ...................................................... G01V 1/303
  USPC .................. 73/597; 345/421; 367/21, 47, 73; 382/128, 294; 702/6, 7, 9, 14, 76
  See application file for complete search history.

(56) References Cited

U.S. PATENT DOCUMENTS

| | | | | |
|---|---|---|---|---|
| 3,571,787 | A * | 3/1971 | Backus et al. | 367/47 |
| 5,693,885 | A * | 12/1997 | Neidell | 73/597 |
| 6,885,943 | B2 * | 4/2005 | Bittar et al. | 702/7 |
| 7,711,162 | B2 * | 5/2010 | Li | 382/128 |

OTHER PUBLICATIONS

"Azimuth," Schlumberger online Oilfield Glossary, Feb. 24, 2009, downloaded on Apr. 14, 2013 from http://web.archive.org/web/20090224072000/http://glossary.oilfield.slb.com/Display.cfm?Term=azimuth.*
"Bin," Schlumberger online Oilfield Glossary, Oct. 17, 2006, downloaded onApr. 14, 2013 from http://web.archive.org/web/20061017123650/http://www.glossary.oilfield.slb.com/Display.cfm?Term=bin.*
"Grid," Schlumberger online Oilfield Glossary, May 1, 2008, downloaded on Apr. 14, 2013 from http://web.archive.org/web/20080501190516/http://www.glossary.oilfield.slb.com/Display.cfm?Term=grid.*
"Migration," Schlumberger online Oilfield Glossary, Jan. 12, 2005, downloaded on Apr. 14, 2013 from http://web.archive.org/web/20050112231710/http://www.glossary.oilfield.slb.com/Display.cfm?Term=migration.*
"Trace," Schlumberger online Oilfield Glossary, Oct. 14, 2008, downloaded on Apr. 14, 2013 from http://web.archive.org/web/20081014202244/http://www.glossary.oilfield.slb.com/Display.cfm?Term=trace.*

(Continued)

*Primary Examiner* — Daniel L Murphy

(57) ABSTRACT

A programmable computer is used to perform the following. 3D seismic data sets, corresponding to each azimuth in seismic data obtained from a multi-azimuth marine seismic survey, are migrated in grids oriented with the corresponding azimuth. Acquisition geometry is stored for each trace in the seismic data sets for each azimuth. Residual analysis, based on the corresponding azimuth, is performed on each of the migrated data sets, generating residuals and reflectors for each azimuth. The residuals and reflectors generated for each azimuth are rotated and merged on a master grid. Reflection tomographic inversion is applied iteratively to the rotated and merged residuals and reflectors to update a velocity model using the acquisition geometry as based on the master grid. The earth's subsurface is imaged using the updated velocity model.

16 Claims, 5 Drawing Sheets

(56) References Cited

OTHER PUBLICATIONS

"Tomography," Wikipedia, Mar. 12, 2013, downloaded on Apr. 12, 2013 from http://en.wikipedia.org/wiki/Tomography.*

Barnes, S. et al., "Multi-azimuth 3-D surface-related multiple elimination—Application to offshore Nile delta", 79th SEG Ann. Mtg., Exp. Abstr., 2009, p. 3153-3157.

Jiao, J. et al., "Multi-parameter controlled automatically picking and variable smoothing for tomography with fast 3D beam prestack depth migration", 79th SEG Ann. Mtg., Exp. Abstr., 2009, p. 3989-3993.

Keggin, J. et al., "Multi-azimuth 3D provides robust improvemenmts in Nile Delta seismic imaging", First Break 25, No. 3, 2007, p. 47-53.

Manning, T.A. et al., "High-resolution multi-azimuth (MAZ) reflection tomography in the Nile delta", 71st EAGE Conf. & Exhib., 2009, Exp. Abstr. V016.

Sherwood, J.W.C. et al., "3D beam prestack depth migration with examples from around the world", Leading Edge, 28, No. 9, 2009, p. 1120-1127.

Zhou, C. et al., "A continuation approach to regularize the reflection tomography with a 3D Gaussian filter", 71st EAGE Conf. & Exhib., 2009, Exp. Abstr. U031.

Zhou, C. et al., "True geometry tomography for velocity model building with application to WATS seismic data", 78th SEG Ann. Mtg., Exp, Abstr., 2008, p. 3260-3264.

* cited by examiner

METHOD FOR BUILDING VELOCITY MODELS FOR IMAGING IN MULTI-AZIMUTH MARINE SEISMIC SURVEYS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of imaging marine seismic streamer data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The resulting seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable. An alternative to having the geophone and hydrophone co-located, is to have sufficient spatial density of sensors so that the respective wavefields recorded by the hydrophone and geophone can be interpolated or extrapolated to produce the two wavefield signals at the same location.

Multi-azimuth 3D seismic surveys have been found effective in attenuating multiples and improving illumination. An important step is constructing a velocity model of sufficiently high resolution to provide high resolution imaging of the earth's subsurface. It would be beneficial to take advantage of the additional seismic information coming from the different shooting directions.

Thus, a need exists for a system and a method for building high resolution velocity models for multi-azimuth marine seismic surveys.

BRIEF SUMMARY OF THE INVENTION

The invention is a method for imaging the earth's subsurface. A programmable computer is used to perform the following. 3D seismic data sets, corresponding to each azimuth in seismic data obtained from a multi-azimuth marine seismic survey, are migrated in grids oriented with the corresponding azimuth. Acquisition geometry is stored for each trace in the seismic data sets for each azimuth. Residual analysis, based on the corresponding azimuth, is performed on each of the migrated data sets, generating residuals and reflectors for each azimuth. The residuals and reflectors generated for each azimuth are rotated and merged on a master grid. Reflection tomographic inversion is applied iteratively to the rotated and merged residuals and reflectors to update a velocity model using the acquisition geometry as based on the master grid. The earth's subsurface is imaged using the updated velocity model.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for imaging the earth's subsurface. In particular, the invention constructs a higher resolution velocity model to provide higher resolution imaging of the earth's subsurface from 3D seismic survey data. The invention is applied to seismic data acquired from a multi-azimuth (MAZ) 3D seismic marine survey. In a multi-azimuth survey, 3D seismic data is acquired in more than one shooting direction (azimuth) over the same survey location. In addition to illuminating the same target from several different directions, different shooting directions illuminate different parts of the target. Multi-azimuth acquisition has been shown to be beneficial for attenuating multiple diffraction energy and improving illumination.

Figure 1:
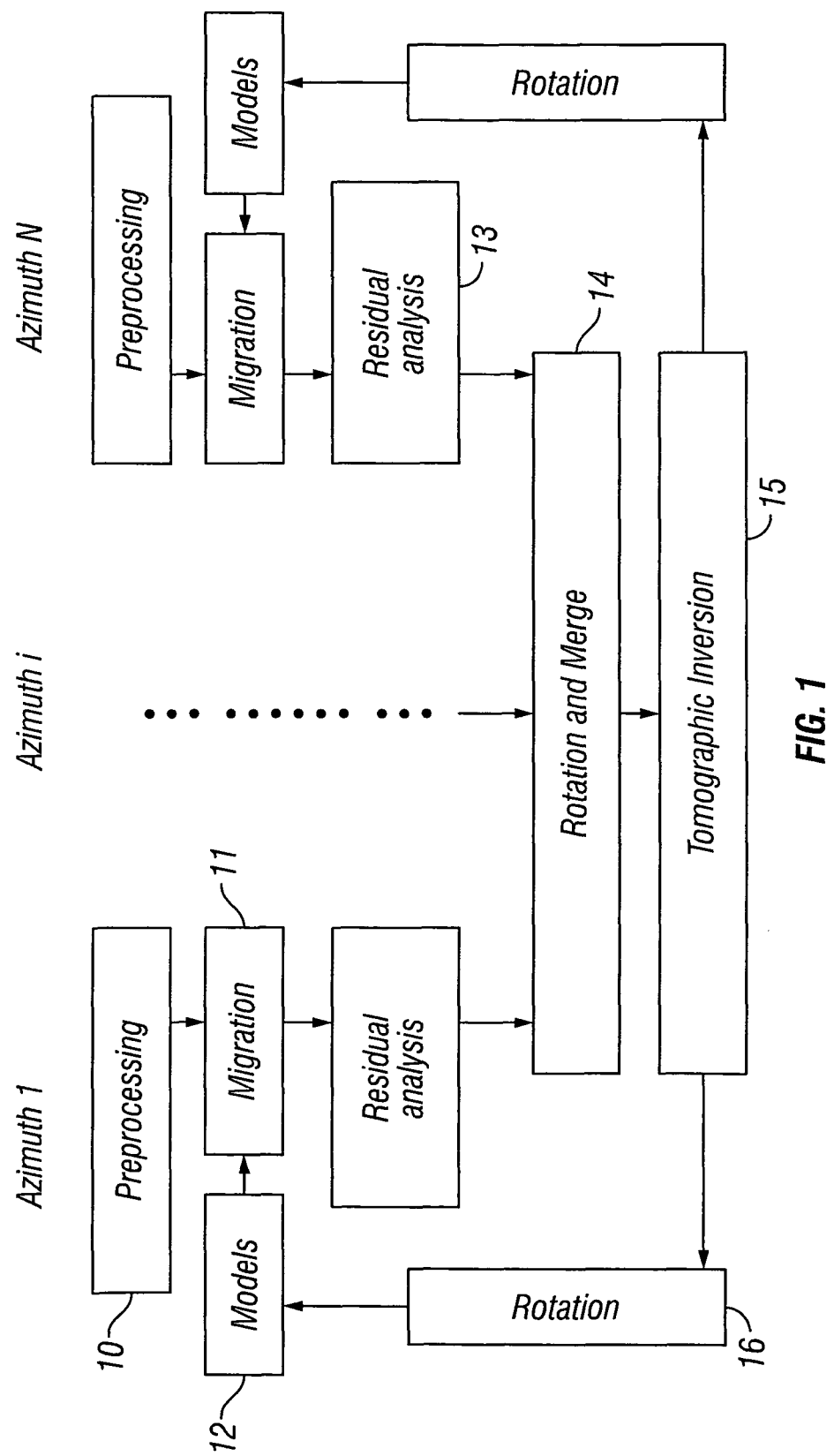
FIG. 1 is a workflow diagram illustrating an embodiment of the invention for building a velocity model from a multi-azimuth marine seismic survey.

FIG. 1 is a workflow diagram illustrating an embodiment of the invention for building a velocity model for imaging from a multi-azimuth marine seismic survey. First, seismic data sets for individual azimuths are pre-processed 10 and migrated 11 using initial velocity models 12 in grids consistent with the shooting directions of the seismic data sets for each azimuth. The acquisition geometry for every trace is stored, typically in disk files, during migration. Secondarily, residual analysis 13 is performed on the migrated data sets f the individual azimuths. Third, the residuals generated by the residual analysis are rotated and merged 14 into a master grid. Finally, reflection tomographic inversion 15 is used to update the velocity model using the pre-stored acquisition geometry based on the master grid. This procedure is iterated, as necessary, to derive a reliable velocity model with the higher resolution. In this case, the inverted data is re-rotated 16 back into the individual velocity models 12 for each shooting direction.

To fully take advantage of the range of data available in a multi-azimuth survey, the acquisition geometry information should be stored so that it can be efficiently retrieved during the tomographic inversion. This information is not always fully retained during migration. In the method of the invention, a Cartesian vector offset is employed to connect the acquisition geometry of the unmigrated data with that of the migrated data. In a Cartesian coordinate system, offset is decomposed into two components: inline offset and cross-line offset. The inline and cross-line offsets are divided into a two dimensional grid with a certain bin size. The grids for the individual azimuth surveys are sequentially numbered with a "common Cartesian offset bin" (CCOB) number. In the case of a multi-azimuth survey, the inline offsets are aligned with the sail lines of the individual surveys, while using a different range of common offset bin numbers for different azimuths.

Figure 2A:
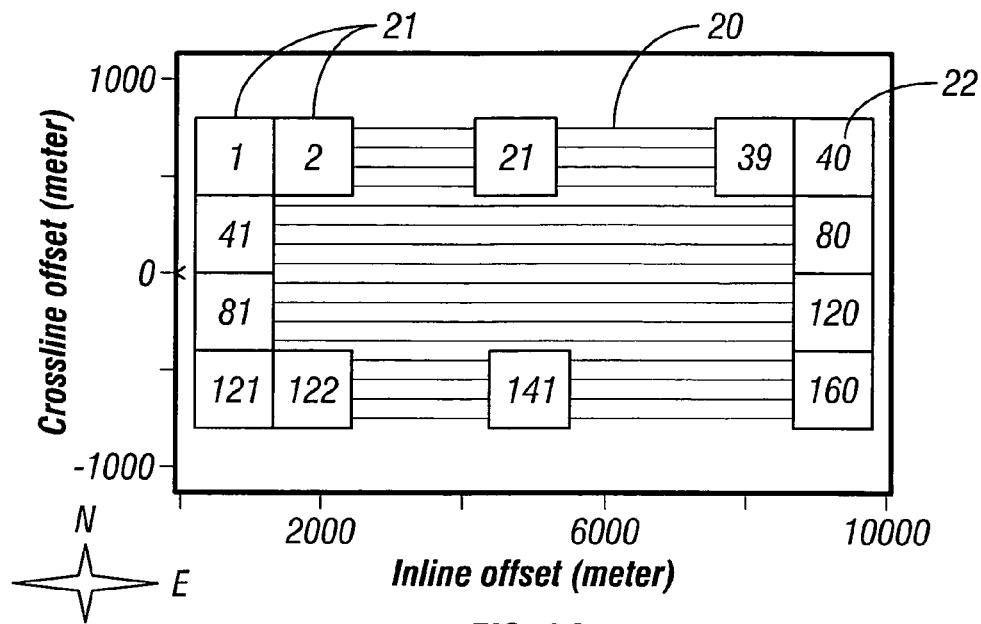
FIGS. 2A and 2B are schematic diagrams of the vessel layout and common Cartesian offset bins for an east-west sail line and a north-south sail line, respectively.
Figure 2B:
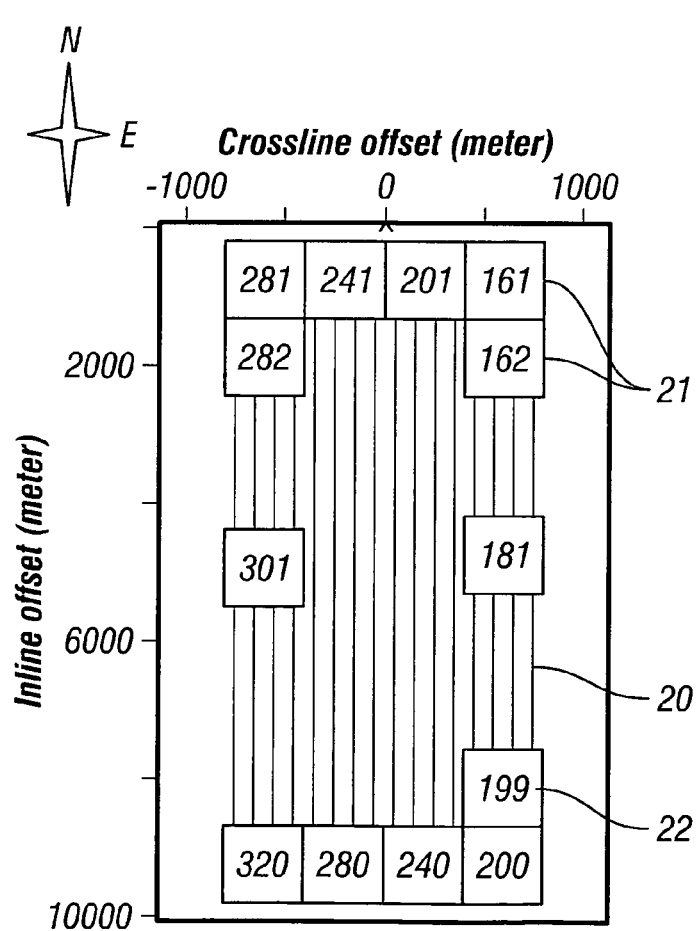

FIGS. 2A and 2B show exemplary vessel layouts for two individual sail lines. FIGS. 2A and 2B are schematic diagrams of the vessel layout and common Cartesian offset bins for an east-west sail line and a north-south sail line, respectively. Both vessels (not shown) have 16 streamers 20 with 100 meter separation and 480 groups of hydrophones with a 20 meter interval. The minimum and maximum inline offsets are 200 and 9780 meters, respectively. The cross-line offset is from −750 to 750 meters. The inline offset bin size is selected as 240 meters and the cross-line offset bin size is selected as 400 meters. This yields 40 bins 21 in the inline direction, 4 bins 21 in the cross-line direction, and 160 bins 21 in total. To identify azimuths, the bins 21 are numbered from 1 to 160 for the east-west sail line, shown in FIG. 2A, while the bins 21 are numbered from 161 to 320 for the north-south sail line, shown in FIG. 2B. The ordinates of shot and receiver locations and the common Cartesian offset bin numbers 22 are pre-stored before migration.

During the independent migration for each individual azimuth, migrated traces are stacked which have the same bin number within a common image point. By this process, the method of the invention connects migrated seismic traces to their corresponding (unmigrated) input traces by the common Cartesian offset bin number.

Figure 3:
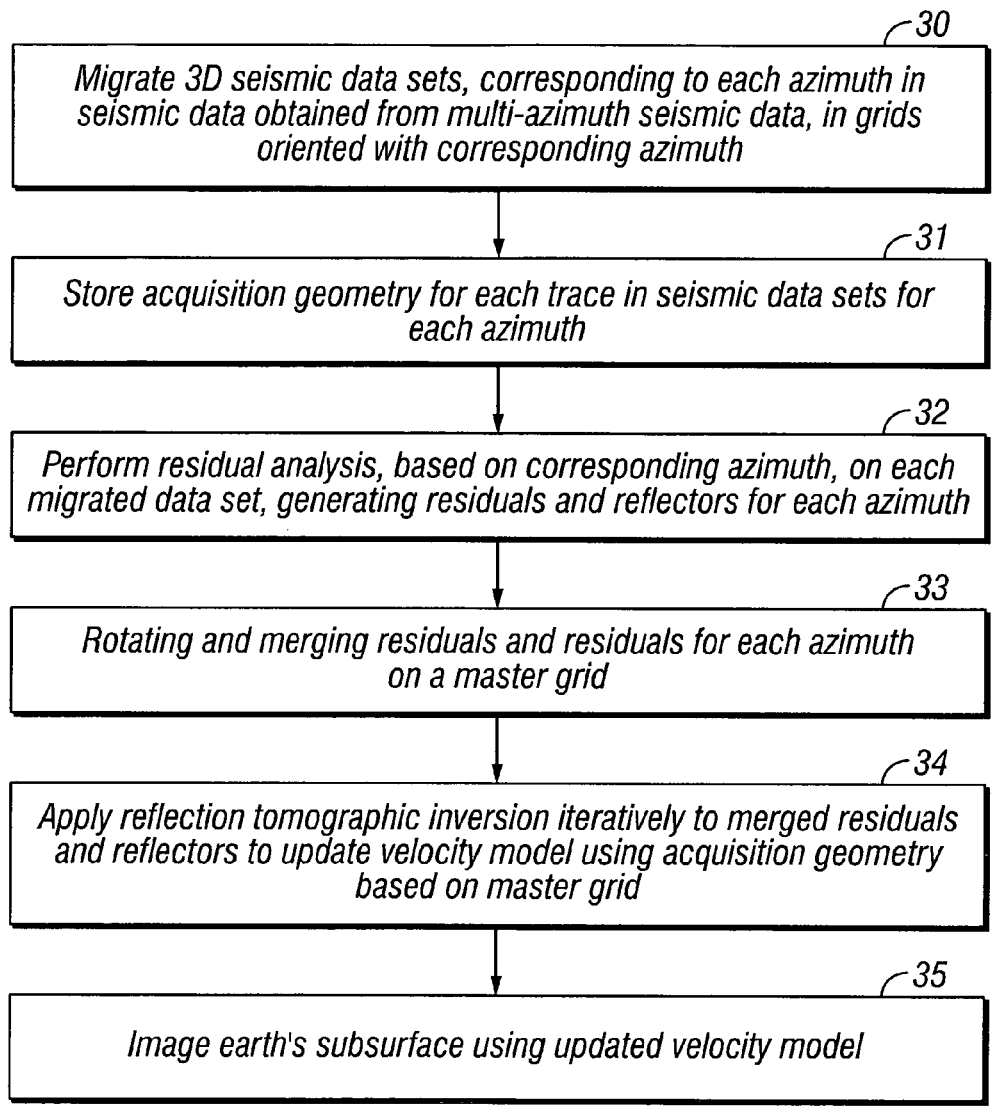
FIG. 3 is a flowchart illustrating an embodiment of the invention for imaging the earth's subsurface.

FIG. 3 is a flowchart illustrating an embodiment of the invention for imaging the earth's subsurface.

At block 30, 3D seismic data sets, corresponding to each azimuth in seismic data obtained from a multi-azimuth marine seismic survey, are individually migrated in a grid oriented with the corresponding azimuth.

At block 31, acquisition geometry are stored for each trace in the seismic data sets from block 30 for each azimuth.

At block 32, residual analysis is performed, based on the corresponding azimuth, on each of the data sets migrated in block 30, thereby generating residuals and reflectors for each azimuth.

At block 33, the residuals and reflectors generated in block 32 for each azimuth are rotated and merged on a master grid.

At block 34, reflection tomographic inversion is iteratively applied to the rotated and merged residuals and reflectors from block 33 to update a velocity model using the acquisition geometry as based on the master grid.

At block 35, the velocity model updated in block 34 is used to image the earth's subsurface.

Figure 4:
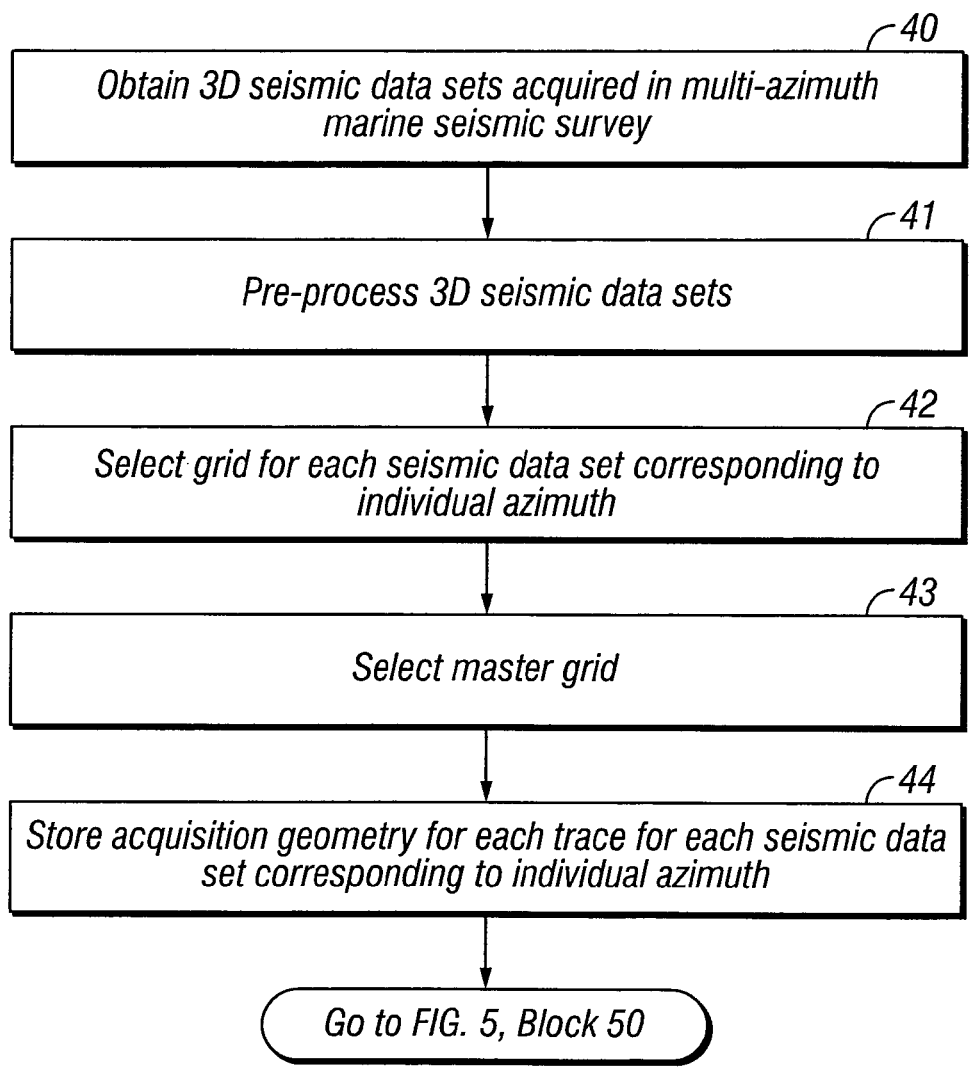
FIG. 4 is a flowchart illustrating an initial portion of another embodiment of the invention for imaging the earth's subsurface.
Figure 5:
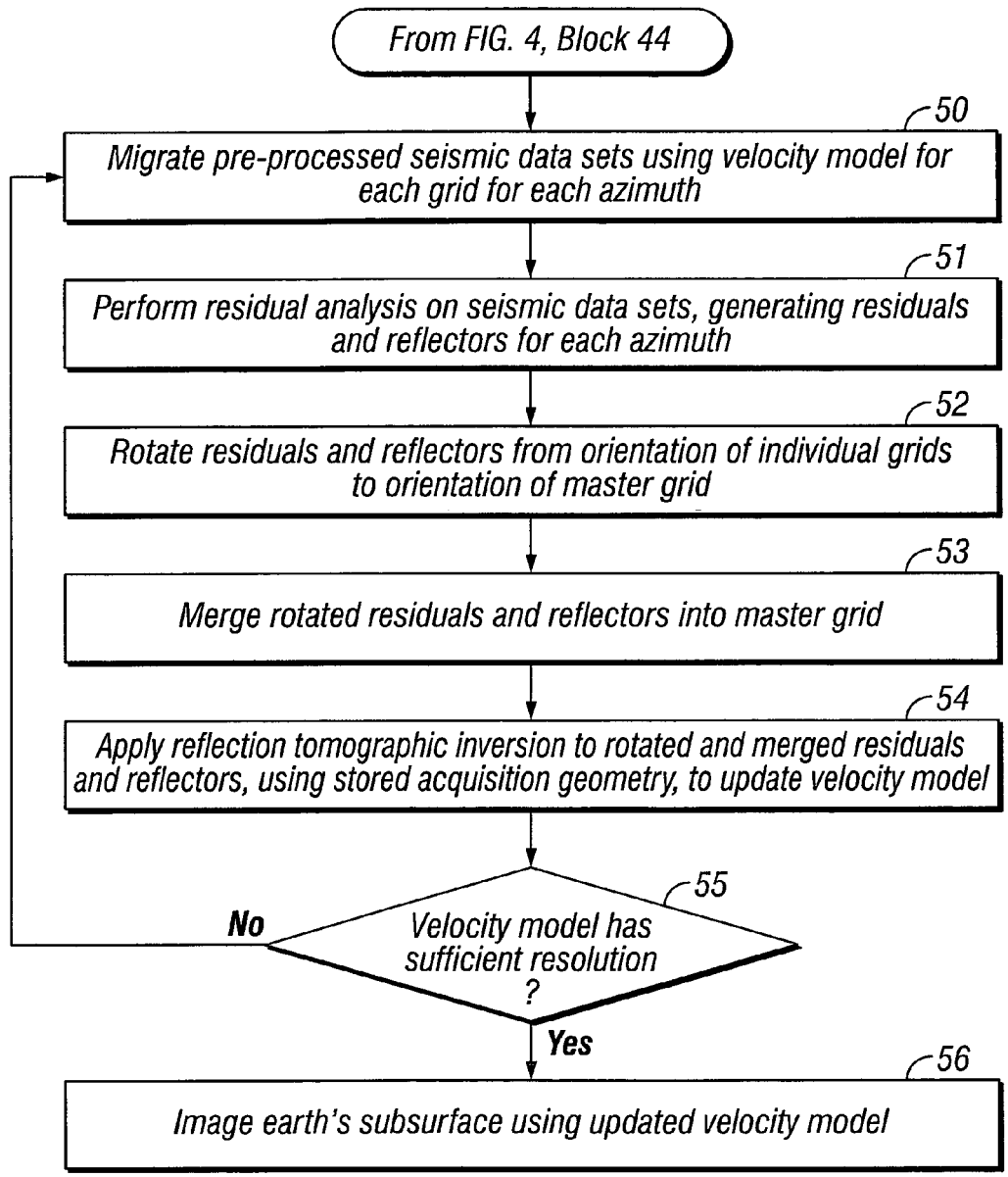
FIG. 5 is a flowchart illustrating a final portion of the embodiment of the invention for imaging the earth's subsurface begun in FIG. 4.

FIGS. 4 and 5 are flowcharts illustrating another embodiment of the invention for imaging the earth's subsurface. FIGS. 4 and 5 present a more detailed embodiment of the more general embodiment illustrated in FIG. 3. FIG. 4 is a flowchart illustrating an initial portion of another embodiment of the invention for imaging the earth's subsurface.

At block 40, 3D seismic data are obtained that has been acquired in a multi-azimuth marine seismic survey.

At block 41, the 3D seismic data obtained in block 40 are pre-processed. This pre-processing includes any appropriate conventional seismic data-processing.

At block 42, a grid is selected for each of the seismic data sets corresponding to an individual azimuth in block 40. Each grid is selected to cover the array of source and receiver locations dictated by the acquisition geometry of the towed source arrays and streamers for that particular azimuth data set. Thus, all source-receiver offsets are covered.

At block 43, a master grid is selected. Any grid that covers all the possible source and receiver locations of all the azimuth data sets may be selected. In one illustrative example, one of the grids for an individual azimuth data set could be selected and extended to cover all the azimuth data sets.

At block 44, acquisition geometry for each trace in the seismic data sets corresponding to individual azimuths in block 42 is stored for later retrieval during inversion. The acquisition geometry data includes, but is not restricted to, the source and receiver locations and the common Cartesian bin numbers discussed in relation to FIGS. 2A and 2B above. The storage is typically in disk files, but is not restricted to this. Any appropriate form of computer storage is included in the invention.

FIG. 5 is a flowchart illustrating a final portion of the embodiment of the invention for imaging the earth's subsurface begun in FIG. 4. The process continues from block 44 of FIG. 4.

At block 50, the seismic data sets pre-processed in block 41 are migrated. The seismic data for each azimuth is individually migrated using an initial velocity model in the grid selected in block 42 for each azimuth. The migration process provides gathers, such as common image gathers (CIG), and a stack.

At block 51, residual analysis is preformed on each of the seismic data sets individually migrated in block 50, thereby generating residuals and reflector orientations for each azimuth.

At block 52, each of the residuals and reflectors generated in block 51 is rotated from the orientation of the individual grid from block 42 to the orientation of the master grid from block 43.

For a typical tomographic inversion based on migrated data, the minimum input consist of residuals at different offsets from the same event within a common image gather and the reflector's orientation associated with the event. In one embodiment, a multi-parameter controlled automatically picking technique is used to pick the residuals and reflectors on the individual azimuth. The parameters that can be selected to determine the picking include, but are not restricted to, semblance from the residual analysis, range of residual move-out (gamma), semblance from dip analysis on the stack volume from block 50, relative amplitude of the stack volume, range of dips, and size of a picking window.

Next, the residuals and reflectors are rotated into the master grid. The reflector's orientation is a vector which consists of two components, slopes in both the inline and cross-line directions. Thus, the reflector is rotated as a vector. To determine the orientation of a reflector, a three dimensional plane is fitted in the adjacent of the reflector by:

$$z = a_i x_i + b_i y_i \tag{1}$$

where z is depth, $x_i$ and $y_i$ are coordinates in the inline and cross-line directions, respectively, of the individual survey, and $a_i$ and $b_i$ are the slopes in the inline and cross-line directions, respectively, of the individual survey, designated by the subscript "i". After rotating to the master grid, the result is:

$$z = a_m x_m + b_m y_m \tag{2}$$

All variables in equation (2) have same meaning as in equation (1), but referring to the master grid, as designated by the subscript "m". The variables are derived by following:

$$\begin{bmatrix} x_m \\ y_m \end{bmatrix} = \begin{bmatrix} \cos\Phi & -\sin\Phi \\ \sin\Phi & \cos\Phi \end{bmatrix} \begin{bmatrix} x_i \\ y_i \end{bmatrix} \tag{3}$$

$$\begin{bmatrix} a_m \\ b_m \end{bmatrix} = \begin{bmatrix} \cos\Phi & -\sin\Phi \\ \sin\Phi & \cos\Phi \end{bmatrix} \begin{bmatrix} a_i \\ b_i \end{bmatrix} \tag{4}$$

where $\Phi$ is the azimuth from the individual survey to the master grid.

At block 53, each of the residuals rotated in block 52 is merged together onto the master grid. The rotated reflectors are interpolated or extrapolated into grid locations on the master grid. The common offset bin numbers are kept unchanged, since the residuals are associated with the bin numbers. Thus, a multi-azimuth survey can be treated as a wide azimuth survey for the purpose of tomographic inversion.

At block 54, reflection tomographic inversion is applied to the residuals and reflectors merged in block 53, using pre-stored acquisition geometry stored in block 44 of FIG. 4, and based on the master grid from block 43 of FIG. 4, to update a velocity model.

Compared with a conventional narrow azimuth survey, a multi-azimuth survey possesses a much wider range of azimuth distribution. In one embodiment, to better incorporate reflections from all azimuths into the inversion, a tomographic inversion based on the true acquisition geometry is employed. As discussed above at block 44 of FIG. 4, all coordinates of shot and receiver locations and the common Cartesian offset bin numbers are pre-stored before migration, according to the method of the invention. The common Cartesian offset bin numbers connect the migrated data back to the true acquisition geometry of the acquired unmigrated data. To set up a linear system to solve for the inversion, reflection ray pairs are traced from a subsurface reflector to the surface. Each reflection ray pair connects migrated events to acquisition geometry through the pre-stored information.

In one embodiment, the linear system is solved by a conjugate gradient solver regularized by 3D Gaussian filters. A Gaussian filter outputs a weighted average of each point's neighborhood, with the average weighted more towards the value of the central points. Therefore, a Gaussian filter preserves edges better than a similarly sized mean filter. By choosing different standard deviations for different spatial zones, the smoothing wavelength is controlled locally. Gradually reducing standard deviations as the tomography iterations progress, builds up the velocity field progressively from the long wavelength components to the shorter ones in a gradual fashion.

At block 55, it is determined if the velocity model updated in block 54 has sufficient resolution. If the answer is no, the velocity model does not have sufficient resolution, then the process returns to block 50 to update each velocity model. If the answer is yes, the velocity model has sufficient resolution, then the process continues to block 56.

At block 56, the velocity model updated in block 54 is used to image the earth's subsurface in the vicinity of the multi-azimuth survey.

The method of the invention for velocity model building strategy for a multi-azimuth survey provides for higher resolution imaging of the earth's subsurface. In one embodiment, the method comprises conducting migration and residual analysis on the individual azimuth data sets independently based on their own grids, rotating and merging the residuals into the master grid according to the method of the invention, and tomographic inversion using the true acquisition geometry based on the master grid. Migration and residual analysis based on the individual azimuth enables application of the best practice suitable for each azimuth data set. According to the method of the invention, the bin number of common Cartesian vector offset bin connects the migrated traces with acquisition geometry which makes the true geometry tomographic inversion practical. The true geometry tomographic inversion includes information from all azimuths in a natural fashion.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for imaging the earth's subsurface, comprising:
using a programmable computer that is programmed to perform the following:
migrating 3D seismic data sets, corresponding to each azimuth in seismic data obtained from a multi-azimuth marine seismic survey, in grids oriented with the corresponding azimuth;
storing acquisition geometry for each trace in the seismic data sets for each azimuth;
performing residual analysis, based on the corresponding azimuth, on each of the migrated data sets, thereby generating residuals and reflectors for each azimuth;
rotating the residuals and reflectors generated for each azimuth with a corresponding grid orientation to an orientation of a master grid that covers source and receiver locations of the seismic data sets;
merging the residuals and reflectors generated for each azimuth on the master grid;
applying reflection tomographic inversion iteratively to the rotated and merged residuals and reflectors to update a velocity model using the acquisition geometry as based on the master grid; and
imaging the earth's subsurface using the updated velocity model.

2. The method of claim 1, wherein the migrating comprises the initial steps of:
obtaining 3D seismic data that has been acquired in a multi-azimuth marine seismic survey;
pre-processing the 3D seismic data;
selecting a grid for each of the seismic data sets corresponding to an individual azimuth;
selecting a master grid; and
storing acquisition geometry for each trace in the seismic data sets corresponding to an individual azimuth.

3. The method of claim 2, wherein the acquisition geometry comprises source and receiver locations and common Cartesian offset bin numbers.

4. The method of claim 1, wherein the residual analysis comprises a multi-parameter controlled automatically picking technique for picking the residuals and reflectors on each azimuth.

5. The method of claim 1, wherein the rotating and merging further comprises:
interpolating and extrapolating the rotated reflectors into rotated reflectors on grid locations of the master grid; and
keeping common Cartesian offset bin numbers unchanged.

6. The method of claim 1, wherein the tomographic inversion comprises a tomographic inversion based on true acquisition geometry.

7. The method of claim 1, wherein the tomographic inversion is solved by a conjugate gradient solver regularized by 3D Gaussian filters.

8. The method of claim 7, wherein the Gaussian filters employ gradually reduced standard deviations to build the velocity model progressively from the long wavelength components to the shorter wavelength components.

9. A non-transitory computer readable medium with a computer program stored thereon, the program having logic operable to cause a programmable computer to perform steps to provide an image of earth's subsurface from seismic data from a multi-azimuth marine seismic survey, comprising:

migrating 3D seismic data sets, corresponding to each azimuth in seismic data obtained from a multi-azimuth marine seismic survey, in grids oriented with the corresponding azimuth;

storing acquisition geometry for each trace in the seismic data sets for each azimuth;

performing residual analysis, based on the corresponding azimuth, on each of the migrated data sets, thereby generating residuals and reflectors for each azimuth;

rotating the residuals and reflectors generated for each azimuth with a corresponding grid orientation to an orientation of a master grid that covers source and receiver locations of the seismic data sets;

merging the residuals and reflectors generated for each azimuth on the master grid;

applying reflection tomographic inversion iteratively to the rotated and merged residuals and reflectors to update a velocity model using the acquisition geometry as based on the master grid; and imaging the earth's subsurface using the updated velocity model.

10. The medium of claim 9, wherein the migrating comprises the initial steps of:

obtaining 3D seismic data that has been acquired in a multi-azimuth marine seismic survey;

pre-processing the 3D seismic data;

selecting a grid for each of the seismic data sets corresponding to an individual azimuth;

selecting a master grid; and storing acquisition geometry for each trace in the seismic data sets corresponding to an individual azimuth.

11. The medium of claim 10, wherein the acquisition geometry comprises source and receiver locations and common Cartesian offset bin numbers.

12. The medium of claim 9, wherein the residual analysis comprises a multi-parameter controlled automatically picking technique for picking the residuals and reflectors on each azimuth.

13. The medium of claim 9, wherein the rotating and merging further comprises:

interpolating and extrapolating the rotated reflectors into rotated reflectors on grid locations of the master grid; and keeping common Cartesian offset bin numbers unchanged.

14. The medium of claim 9, wherein the tomographic inversion comprises a tomographic inversion based on true acquisition geometry.

15. The medium of claim 9, wherein the tomographic inversion is solved by a conjugate gradient solver regularized by 3D Gaussian filters.

16. The method of claim 15, wherein the Gaussian filters employ gradually reduced standard deviations to build the velocity model progressively from the long wavelength components to the shorter wavelength components.

* * * * *